United States Patent
Ohtani et al.

(10) Patent No.: US 7,454,108 B2
(45) Date of Patent: Nov. 18, 2008

(54) MULTIMODE FIBER TRANSMISSION SYSTEM

(75) Inventors: Toshihiro Ohtani, Yokohama (JP); Masaki Satoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/066,394

(22) Filed: Feb. 28, 2005

(65) Prior Publication Data
US 2006/0093295 A1    May 4, 2006

(30) Foreign Application Priority Data
Nov. 2, 2004    (JP)    ............... 2004-319409

(51) Int. Cl.
G02B 6/02    (2006.01)
(52) U.S. Cl. ..................................... 385/123
(58) Field of Classification Search .............. None
See application file for complete search history.

(56) References Cited

U.S. PATENT DOCUMENTS

2002/0101577 A1*  8/2002  Thwing et al. ............. 356/73.1
2003/0048746 A1*  3/2003  Guess et al. ................ 370/219

FOREIGN PATENT DOCUMENTS

JP    11-271178    *  5/1999
JP    11-271178       10/1999

* cited by examiner

*Primary Examiner*—Sung Pak
*Assistant Examiner*—Hoang Tran
(74) *Attorney, Agent, or Firm*—Hanify & King

(57) ABSTRACT

An optical signal propagating through a transmission line of a multimode fiber is branched by an MMF coupler of a reception device, and the intensity of the signal is detected by a MMF monitor PD. After connecting from the multimode fiber to a single-mode fiber, the optical signal is branched by a SMF coupler, and the intensity of the optical signal after the connection by a SMF monitor PD is detected. A coupling loss is calculated from the two detection results and the status of the occurrence of an error rate is estimated from the obtained coupling loss.

10 Claims, 22 Drawing Sheets

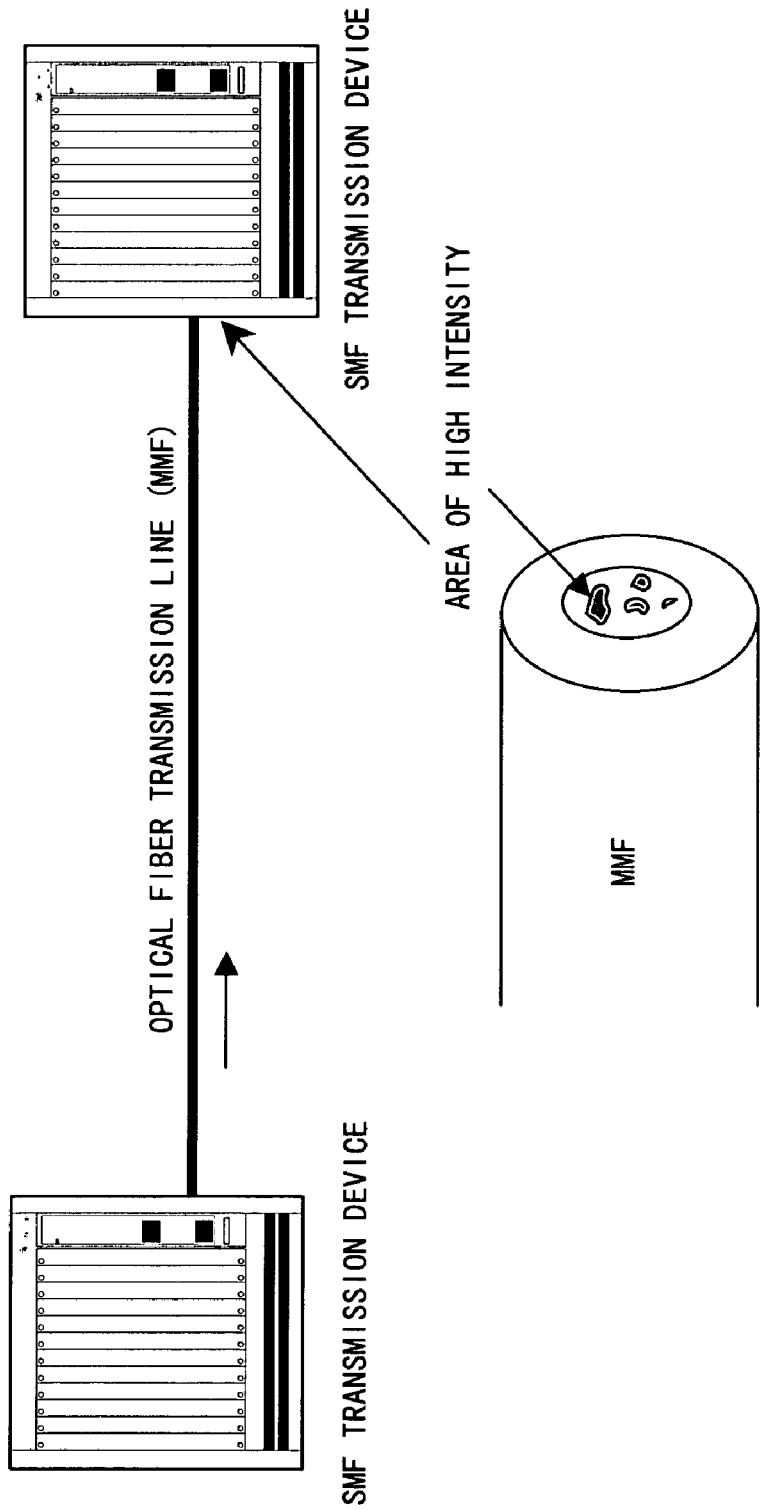
F I G. 3

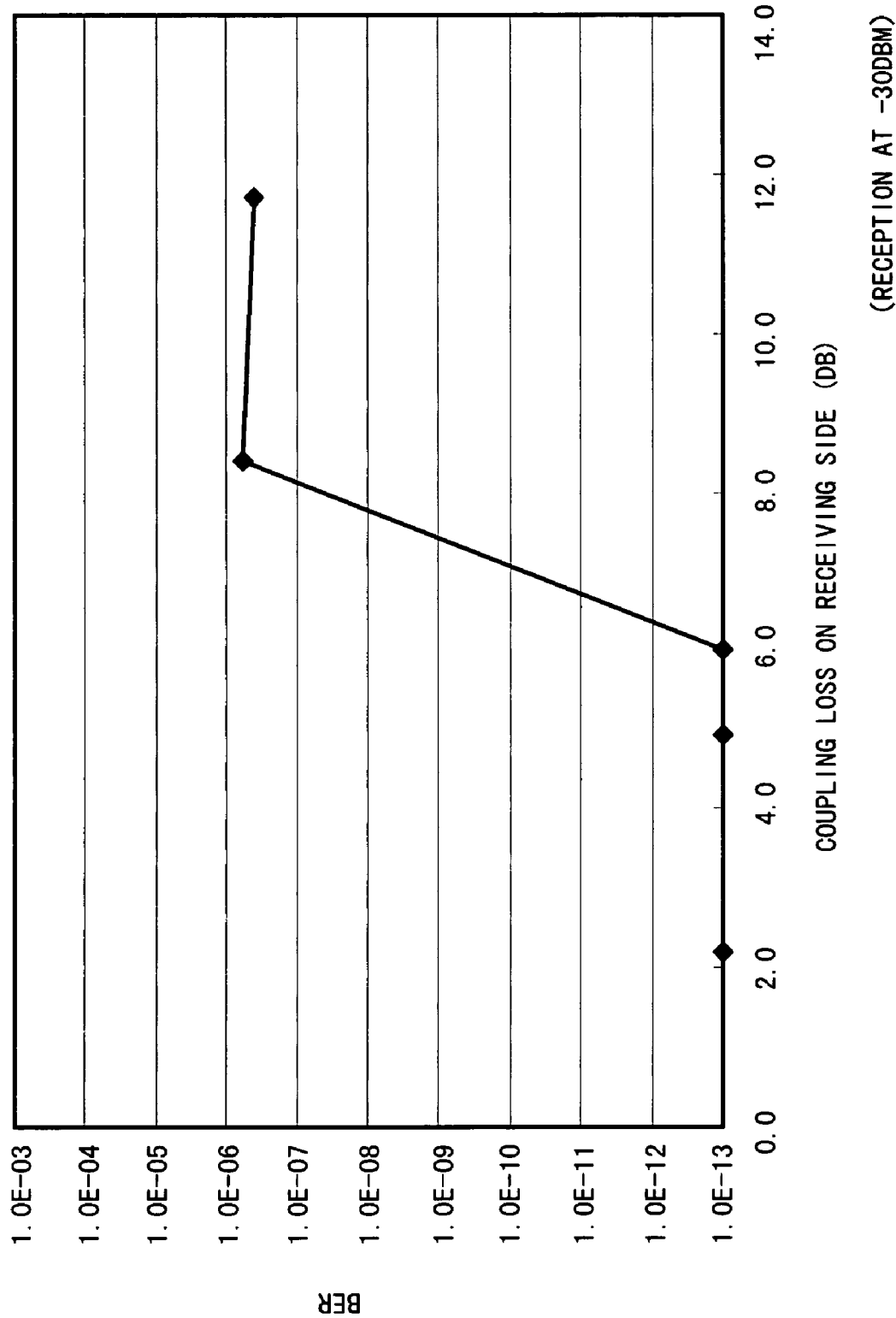
F I G. 5

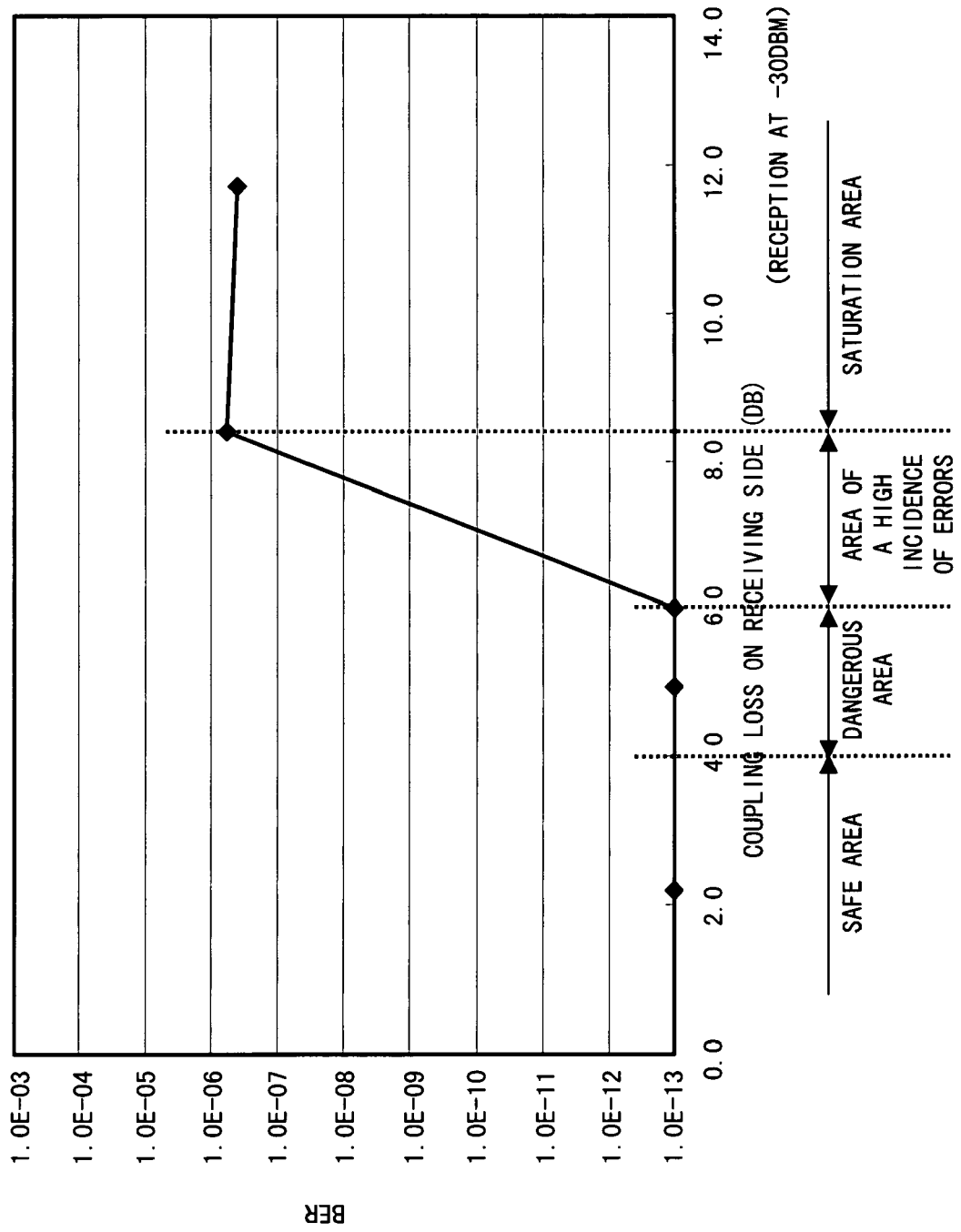
F I G. 7

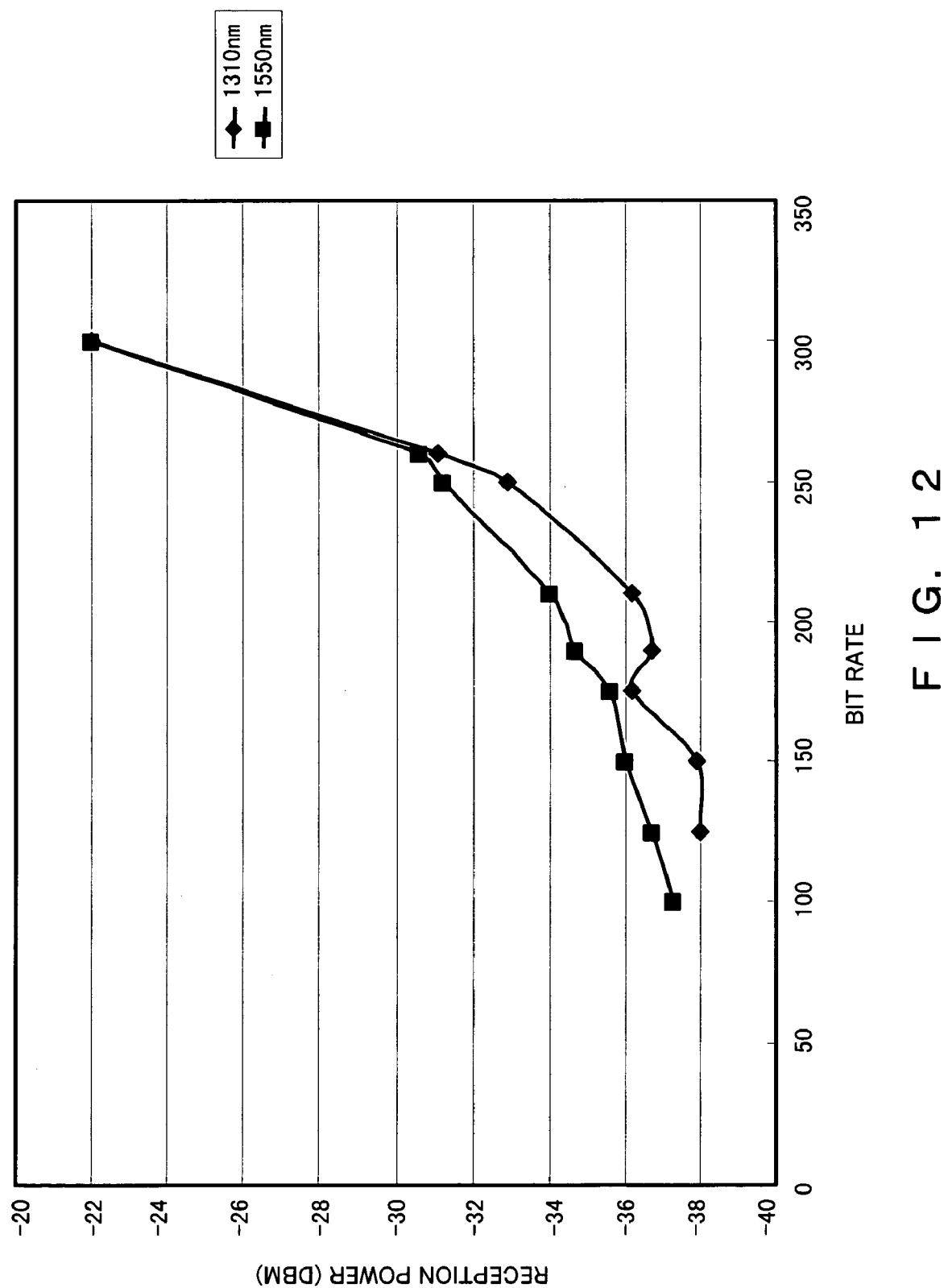
F I G. 12

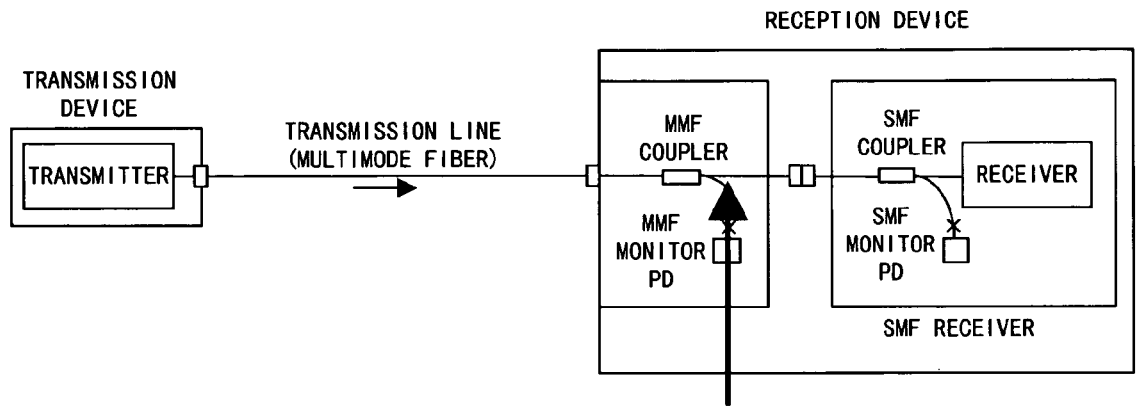
MMF/SMF ADAPTER CONNECTION POINT
OTHER THAN COUPLING LOSS DUE TO MODAL NOISE TO BE CHECKED, PHYSICAL CORE CENTER DISPLACEMENT COMPONENTS ARE ALSO INCLUDED.
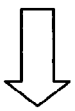
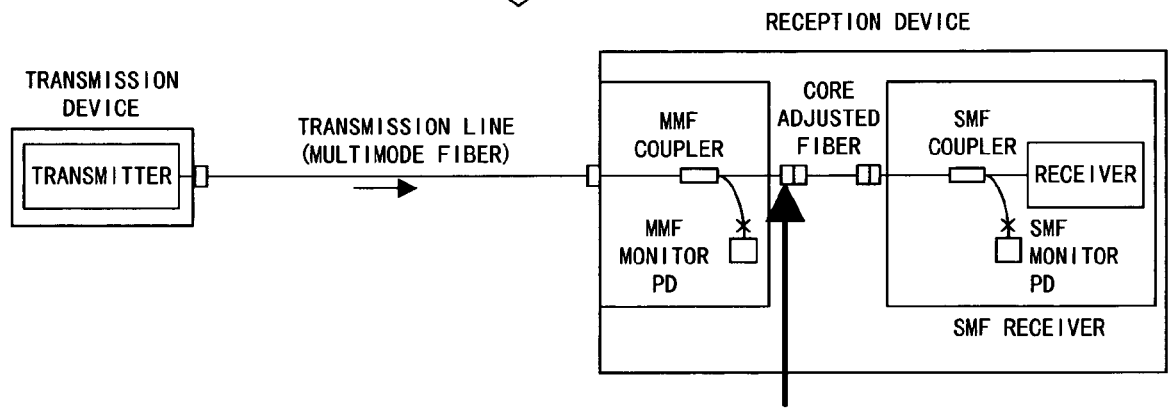
CONNECTION USING CORE ADJUSTED FIBER
THUS, REDUCING COUPLING LOSS BY CENTER DISPLACING BY MMF/SMF UNIT
F I G. 1 7

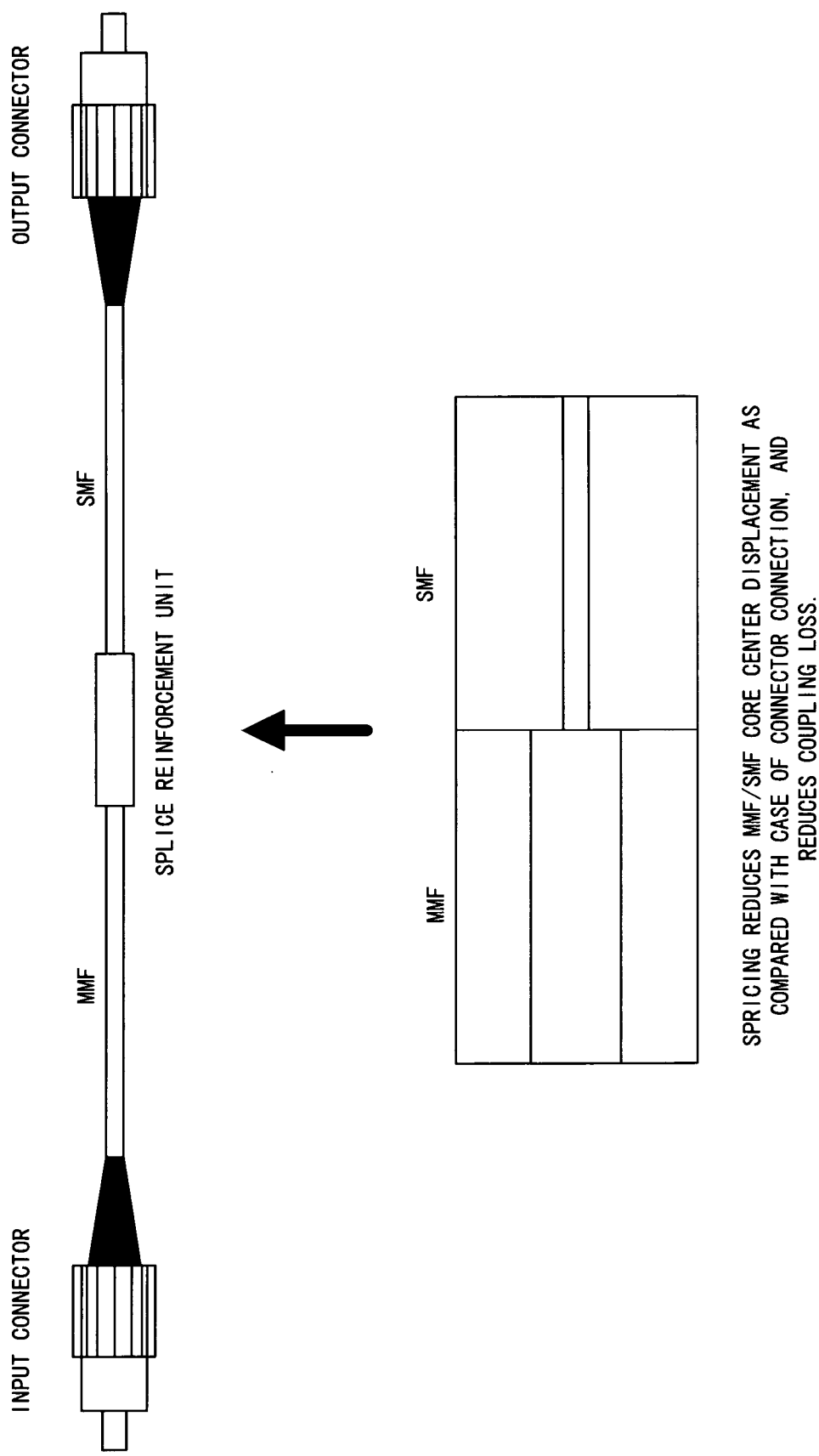
F I G. 1 8

MULTIMODE FIBER TRANSMISSION SYSTEM

BACKGROUND OF THE INVENTION

1. Field of the Invention

The present invention relates to a transmission system using a multimode fiber transmission line.

2. Description of the Related Art

When a multimode fiber (MMF) transmission is performed, it is desired that MMF dedicated equipment is used. However, since most optical fiber is single-mode fiber, and there are few transmission lines using the multimode fiber, there can be a case in which no MMF dedicated equipment is developed and equipment specifically developed for single-mode fiber transmission is used.

In the case of the MMF transmission, it is necessary to consider the band characteristics of a specific MMF fiber in addition to the transmission line loss. Additionally if SMF dedicated equipment is deployed, it is further necessary to consider coupling loss between the transmission line (MMF) and reception equipment (dedicated for SMF), and the effects of modal noise generated by the inter-modal interference of the transmission line fiber. Modal noise refers to the degradation of the received waveform due to impossible reception of all modes at the receiver because of inter-modal interference in the transmission line fiber.

Among these losses, the transmission line loss can be predicted in advance, and the band characteristics of the fiber can be checked by determining the viability of transmission based on the characteristics observed at the receiver end, but the modal noise largely depends on the transmission line environment and cannot be calculated. Furthermore, it greatly affects coupling loss.

FIGS. 1A and 1B are explanatory views of the effect of inter-modal interference.

In the ideal case in which there is no inter-modal interference (FIG. 1A), the light intensity distribution of the propagating beam in its cross section is a Gaussian distribution on the receiving end with the highest power corresponding to the center of the core, and the coupling loss can be calculated to some extent. However, when there is interference among propagation modes (FIG. 1B), non-uniform light intensity distributions are generated at the MMF section.

In this case, when an SMF receiver is connected to the receiving end, the coupling loss between MMF/SMF is large. In the connection unit, only a specific mode component that generates inter-modal interference is subject to a large coupling loss, and the received data cannot be restored to the original state even after the optical/electrical conversion by the reception unit, thereby greatly degrading the transmission characteristic.

When a transmission line is SMF, there is only one mode in the transmission line (SMF). Therefore, there is no inter-modal interference, and there is no difference in core diameter at the receiving connection unit. As a result, fundamentally no coupling loss occurs. In reality, a coupling loss of a maximum of 0.5 dB occurs, but it is a loss detected uniformly in the single mode propagated by the single mode fiber. Therefore, no specific component is attenuated, and no degradation of the transmission characteristics occurs.

The conventional technology of patent literature 1 discloses a technology for measuring the optical loss by measuring the optical power.

[Patent Literature 1] Japanese Patent Laid-open Publication No. Hei 11-271178

As described above, when SMF dedicated equipment is deployed for MMF transmission, degradation of the transmission characteristics occurs, and the degree largely depends on the transmission line length, the transmission line environment, etc., but there is currently no method of predicting the occurrence of errors.

SUMMARY OF THE INVENTION

The present invention aims at providing a transmission system capable of predicting the degradation of the error rate of a signal from the coupling loss when an optical signal transmitted through multimode fiber is received by a single-mode fiber receiver.

The transmission system according to the present invention receives an optical signal transmitted through multimode fiber via a reception device for receiving a transmission signal via single-mode fiber, and includes: an MMF light intensity detection device for detecting light intensity of an optical signal propagating via a multimode fiber at the stage before a connection point between the multimode fiber and a single-mode fiber; an SMF light intensity detection device for detecting light intensity of an optical signal propagating via a single-mode fiber at a stage after the connection point between the multimode fiber and the single-mode fiber; and a control device for obtaining a coupling loss between the multimode fiber and the single-mode fiber from a detection result of the MMF light intensity detection device and the SMF light intensity detection device, and predicting the occurrence of errors of a signal in a reception device.

According to the present invention, the degradation of an error rate can be predicted with a simple configuration, and a single-mode fiber receiver can receive optical signal transmitted via a multimode fiber with high precision by, for example, increasing the transmission power on the transmitting side such that the error rate cannot be further degraded.

BRIEF DESCRIPTION OF THE DRAWINGS

FIG. 3 shows the concept of non-uniform power distribution due to inter-modal interference;

FIG. 5 shows the relationship between a coupling loss and a BER;

FIG. 7 is an explanatory view of the basis for predicting the degradation of the BER based on the value of the coupling loss;

FIG. 12 is a graph showing the relationship between a bit rate and reception power;

FIG. 17 is an explanatory view (1) of another configuration required when a monitor function is implemented as an optional module;

FIG. 18 is an explanatory view (2) of another configuration required when a monitor function is implemented as an optional module;

DESCRIPTION OF THE PREFERRED EMBODIMENTS

Figure 1:
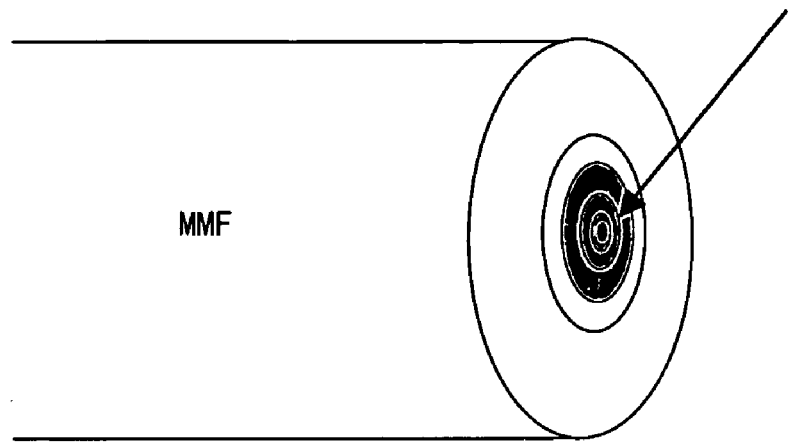
FIGS. 1A and 1B are explanatory views of the effects of inter-modal interference.
Figure 1:
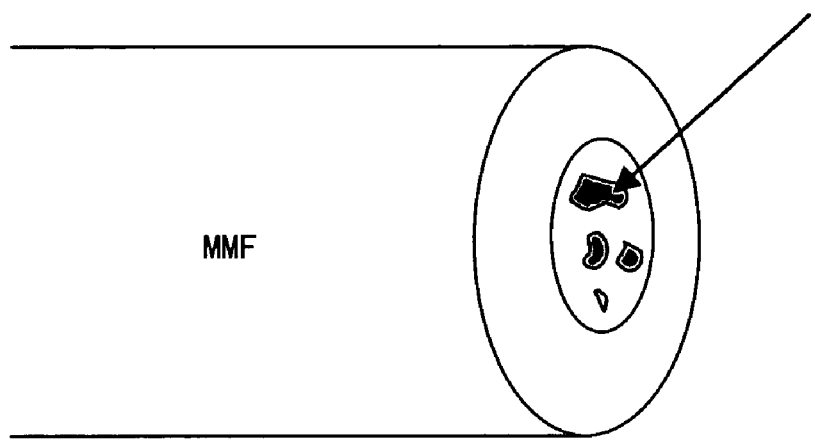

When SMF dedicated equipment is applied to MMF transmission, the dominant factor in the degradation of the transmission characteristics is the non-uniform power distribution (modal noise) caused by inter-modal interference (refer to FIGS. 1A and 1B).

Although The non-uniform power distribution affects the coupling loss in the MMF/SMF connection unit, the present invention pays attention to the close relation between the MMF/SMF coupling loss and the transmission characteristics of the reception unit.

Using the relationship between the MMF/SMF coupling loss and the transmission characteristics of the reception unit, the degree of an error can be indirectly monitored by monitoring the coupling loss at the receiving end, and it is predicted whether there is no problem or it is the state before the occurrence of an error even under the situation with no errors. That is, the occurrence of errors can be predicted.

Figure 2:
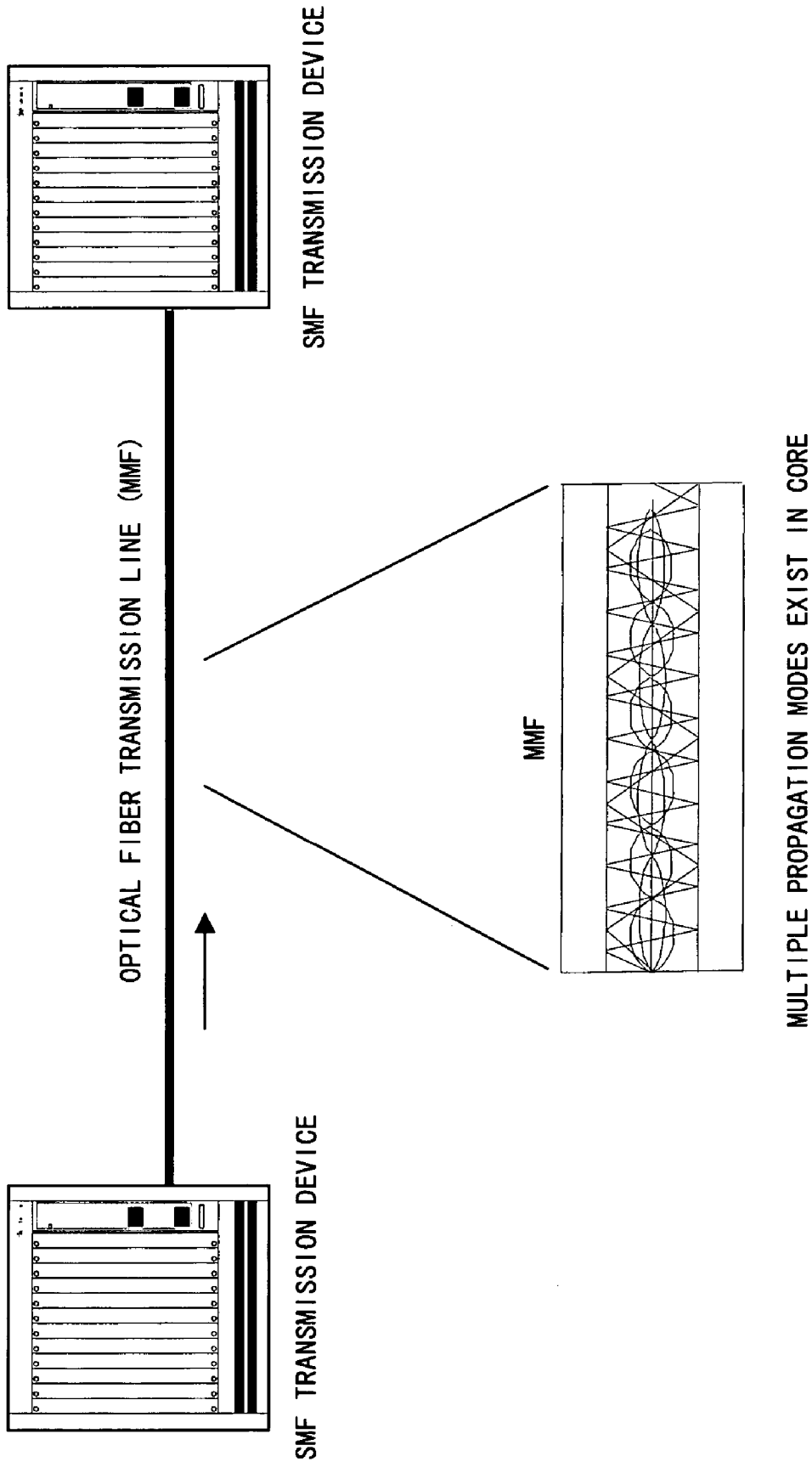
FIG. 2 shows the concept of the propagation mode.
Figure 4:
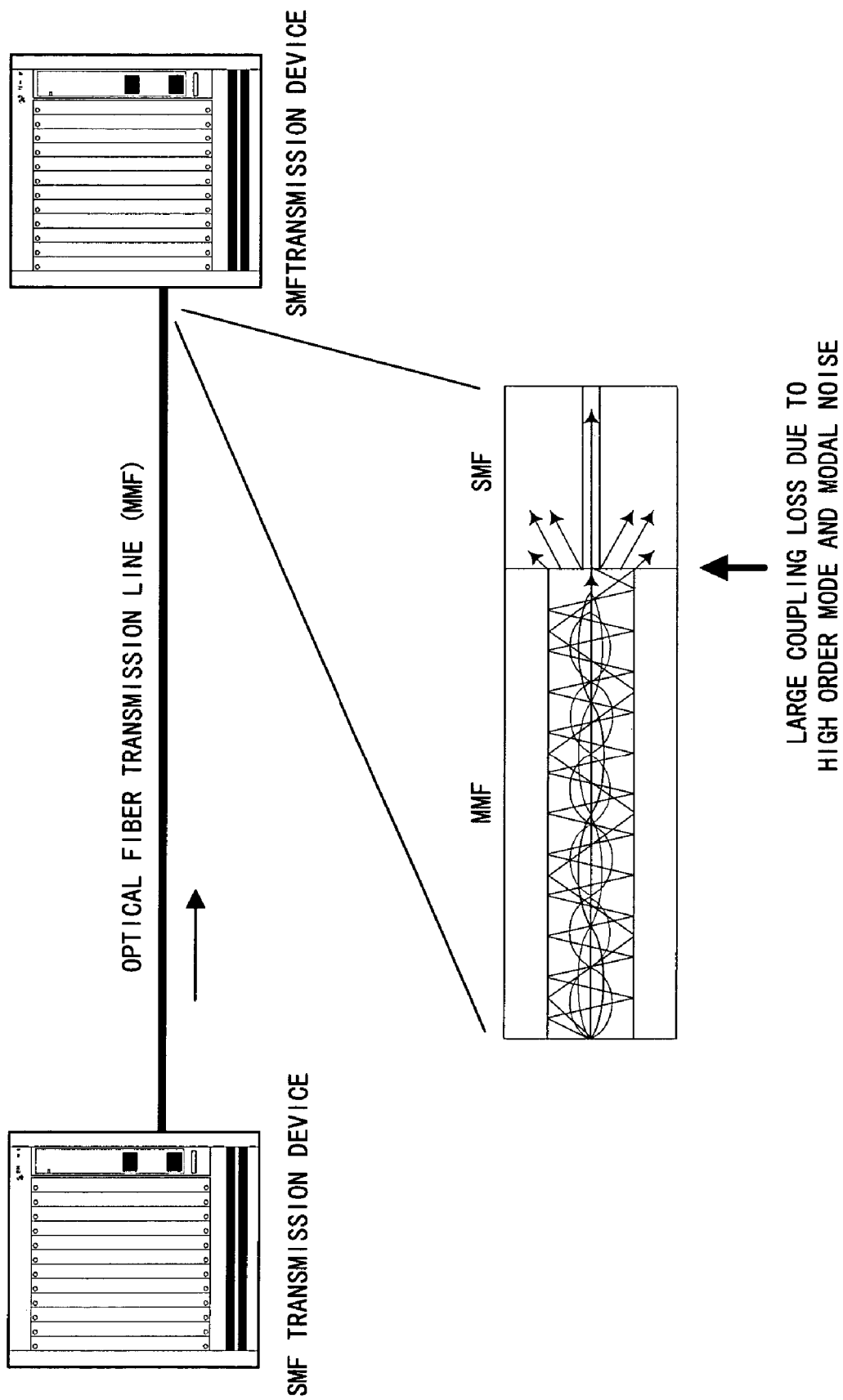
FIG. 4 shows the concept of modal noise.

FIG. 2 shows the concept of propagation modes. FIG. 3 shows the concept of the non-uniform power distribution caused by inter-modal interference. FIG. 4 shows the concept of modal noise.

As shown in FIG. 2, since the diameter of the core of a multimode fiber is large, there is a plurality of optical propagation paths in the core, thus it is called a multimode.

As shown in FIG. 3, when an optical signal having high coherency such as LD light propagates for several kilometers or more as a plurality of modes, interference between different modes occurs in the core. As a result, non-uniform power distribution is generated on the core section on the receiving side (modal noise).

As shown in FIG. 4, when a non-uniform power distribution connects to SMF in a status in which non-uniform distribution exists, the optical power component existing near the perimeter of the MMF core is outside the SMF core, but a part of the power is not only simply attenuated, but also the situation equivalent to the reduction of only a specific mode occurs, thereby preventing the pulse wave form from being restored to its original form even after the electrical conversion by the reception unit.

Therefore, the transmission error characteristics are degraded (when MMF dedicated equipment receives a signal, almost no coupling loss occurs, and no loss is made only on a specific mode, therefore, there is basically no degradation of a transmission error characteristic).

The modal noise largely depends on the length of a transmission line, the transmission line environment, the quality of the connection with transmission/reception equipment, etc. and also on time.

When an optical signal is input to a receiver via SMF after the MMF transmission, a coupling loss occurs in the MMF/SMF connection unit, but as described above, the coupling loss does not affect all modes uniformly, but affects only the mode component that has mainly caused inter-modal interference and has contributed to the intensity distribution at a perimeter of the core.

FIG. 5 shows the relationship between coupling loss and BER.

As a result of an experiment, it has been determined that there is a relationship between coupling loss and BER characteristic as shown in FIG. 5 (during reception at −30 dBm: as receiving loss increases, transmission power is increased and a measurement is made to maintain reception power at −30 dBm).

That is, when coupling loss exceeds a predetermined value, the error rate sharply increases, and there is almost no occurrence of errors in an area lower than the value.

Therefore, when a circuit for monitoring coupling loss is configured in a reception unit MMF transmission is performed by SMF dedicated equipment, error characteristic can be indirectly monitored. In addition, since coupling loss also changes in an area where no error occurs, it can be estimated whether there is no problem or it is a status immediately before an error occurs if the change is monitored.

Figure 6:
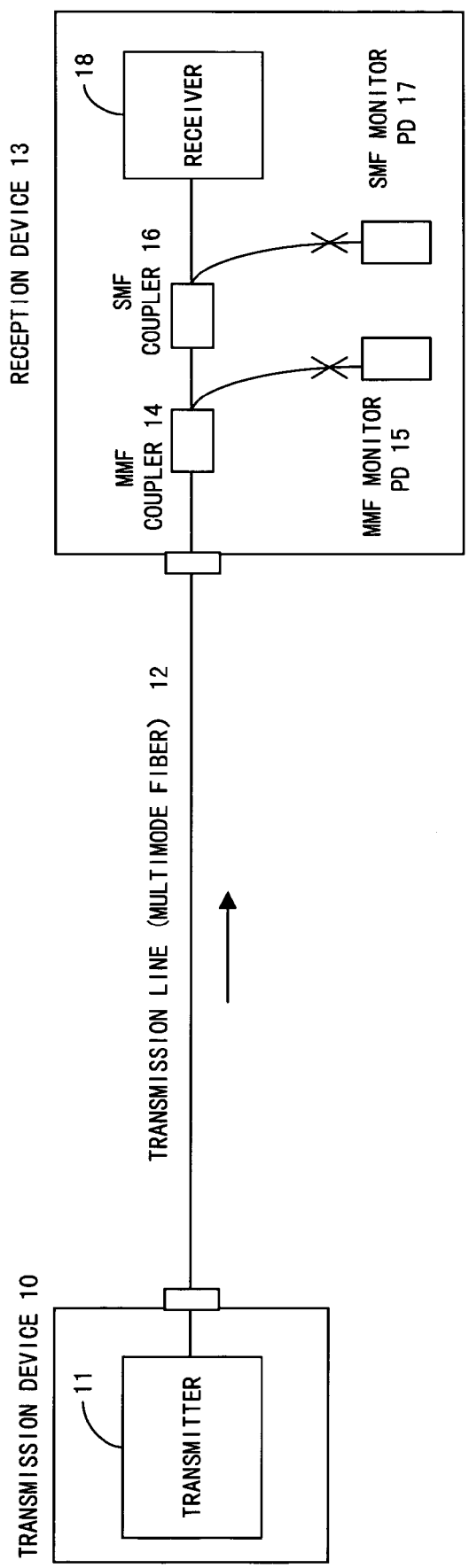
FIG. 6 is a basic block diagram with a hardware configuration having an MMF/SMF coupling loss monitor when SMF dedicated equipment is adopted for MMF transmission.

FIG. 6 is a basic block diagram of the hardware configuration for adding an MMF/SMF coupling loss monitor when SMF dedicated equipment is adopted for MMF transmission.

The loss of an MMF/SMF connection unit is obtained by normally adding an MMF input level monitor unit to an SMF input level monitor unit mounted on a reception unit, and comparing the power monitors between them.

In FIG. 6, an optical signal transmitted from a transmitter 11 of a transmission device 10 propagates a transmission line 12 configured by a multimode fiber, and is input to a reception device 13. An MMF coupler 14 of the reception device 13 branches the optical signal which has propagated the MMF, and an MMF monitor PD 15 detects the intensity. The optical signal which has passed the MMF coupler 14 is first coupled to the SMF, and is branched by an SMF coupler 16, and the intensity is detected by an SMF monitor PD 17. A coupling loss occurs in a connection of the MMF to the SMF. An optical signal passing the SMF coupler 16 is received by a receiver 18.

As shown in FIG. 5, there is a close relationship between receiving MMF/SMF coupling loss and BER. If the coupling loss can be monitored, the occurrence of errors can be predicted in a status where there is no occurrence of errors with the value.

FIG. 7 is an explanatory view of predicting the degradation of the BER from the value of a coupling loss.

As shown in FIG. 7, some levels are determined by the values of coupling loss, and an alarm generating process is performed. In the example shown in FIG. 7, safe area is 4 dB or lower, a dangerous area is 4~6 dB, an area of a high incidence of errors is 6~8.3 dB, and a saturation area is 8.3 dB or higher. For example, when coupling loss is 4~6 dB, there is no actual occurrence of errors, but it is the status immediately before the status with a high occurrence of errors, and notification of a dangerous status is issued to a maintainer.

Figure 8:
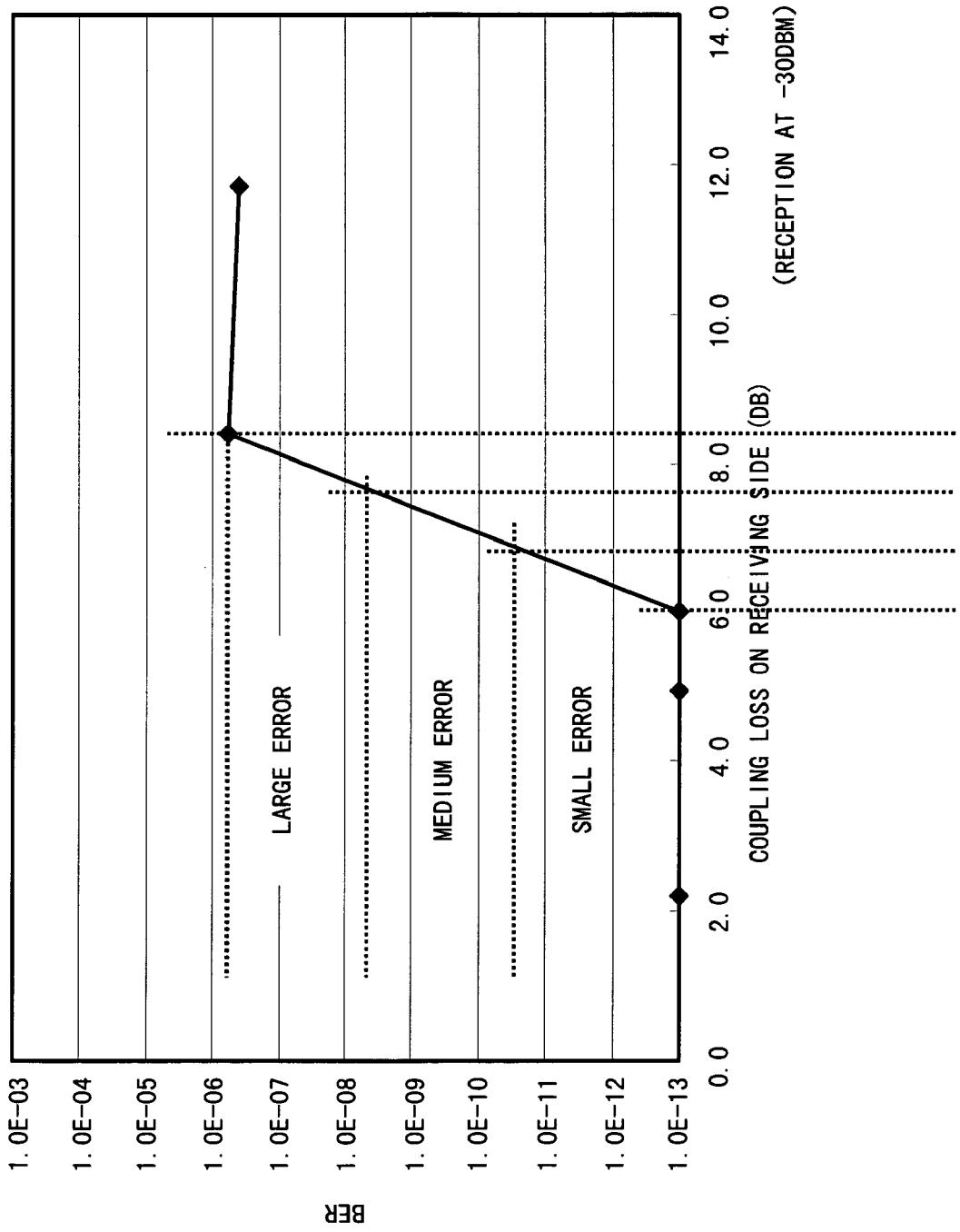
FIG. 8 is an explanatory view showing how a coupling loss result is used by an error monitor.

FIG. 8 is an explanatory view showing how a coupling loss result is used by an error monitor.

Similarly, an area of 6~8.3 dB is an area of a high incidence of errors, but as shown by the graph, since a BER value depends on the value of coupling loss, there is the possibility of low precision, but it can be indirectly used as an error monitor. For example, in the case shown in FIG. 8, the area of 6~8.3 dB is divided into three areas, and they are respectively defined as an area of a low incidence of errors, an area of an immediate incidence of errors, and an area of a high incidence of errors.

Figure 9:
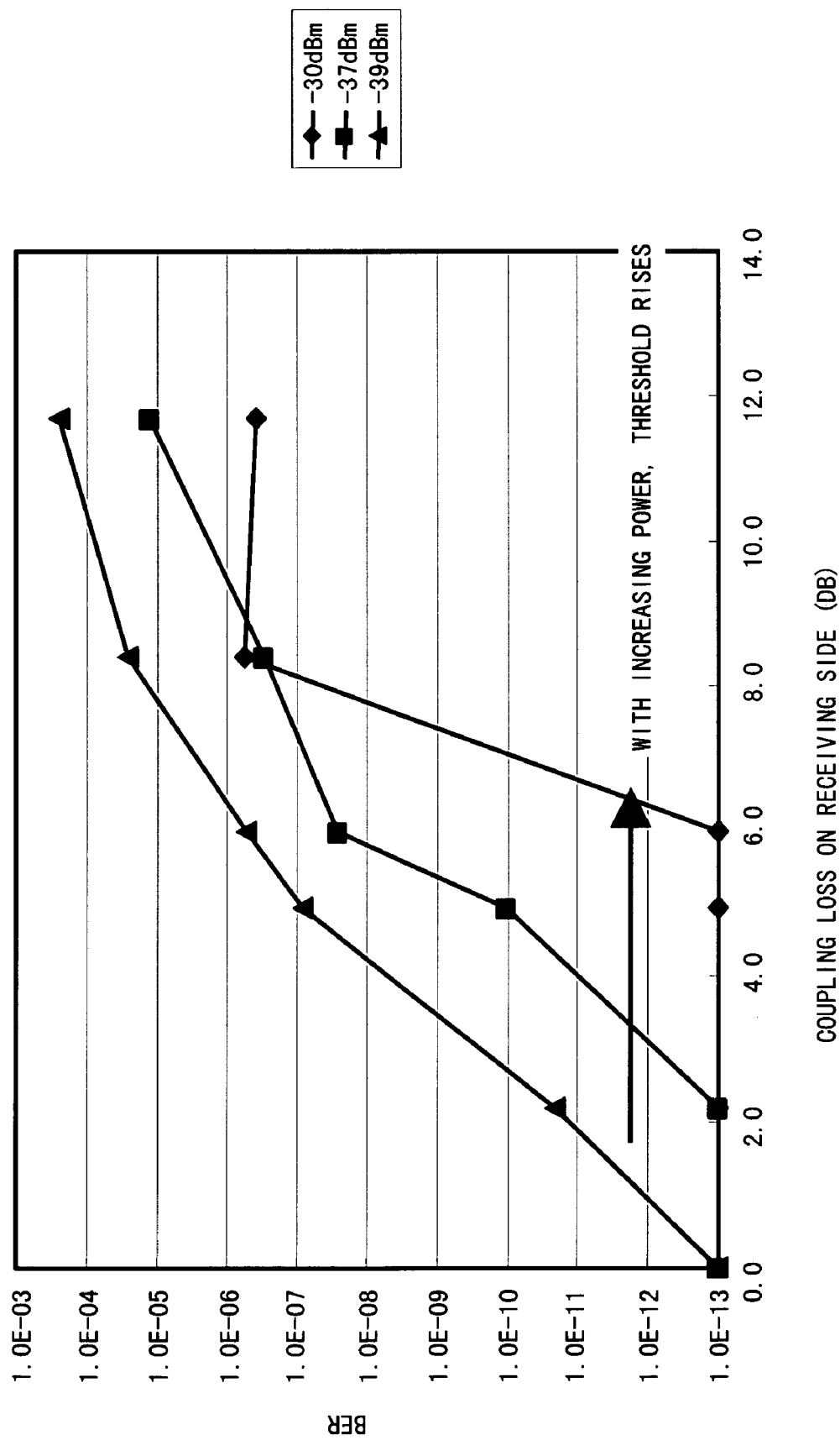
FIG. 9 shows the relationship between reception power, coupling loss, and BER.

FIG. 9 shows the relationship between reception power, a coupling loss, and BER. It is a graph of the cases of −39 dBm, −37 dBm, and −30 dBm. With increasing reception power, the threshold of a coupling loss at which an error occurs rises.

Figure 10:
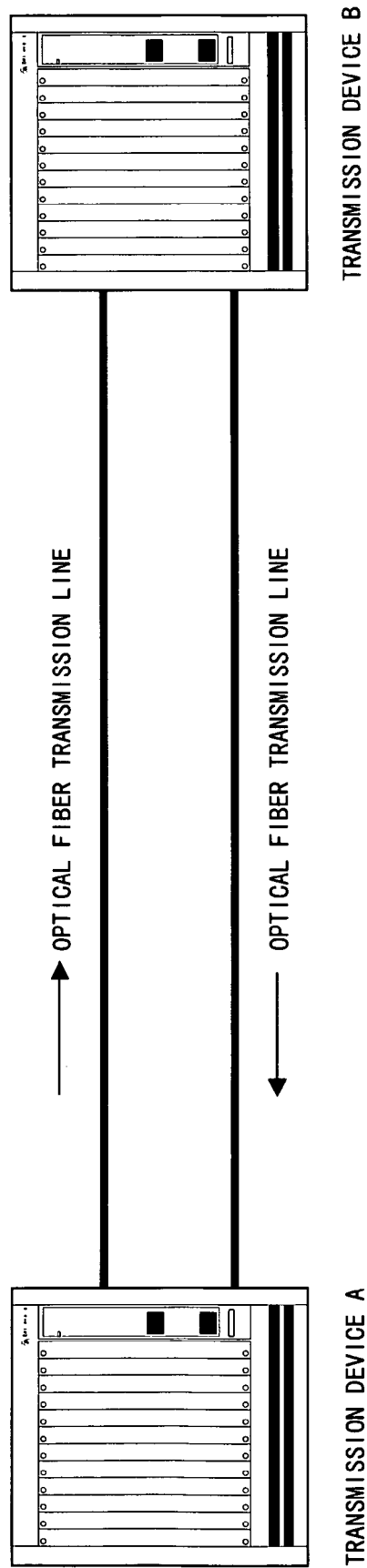
FIG. 10 shows a device image according to an embodiment of the present invention.

FIG. 10 shows a device image according to an embodiment of the present invention. Many devices have a configuration of performing up stream and down stream communications with an opposite device using two fibers. With such a configuration, when it is recognized through a coupling loss monitor that an error is about to occur, a notification that an error is about to occur is given to the up stream side of the current circuit using another circuit, and the transmission power in the up stream side is increased, or the bit rate is decreased. For example, the occurrence of errors can be avoided by exploiting the characteristics shown in FIG. 9.

Figure 11:
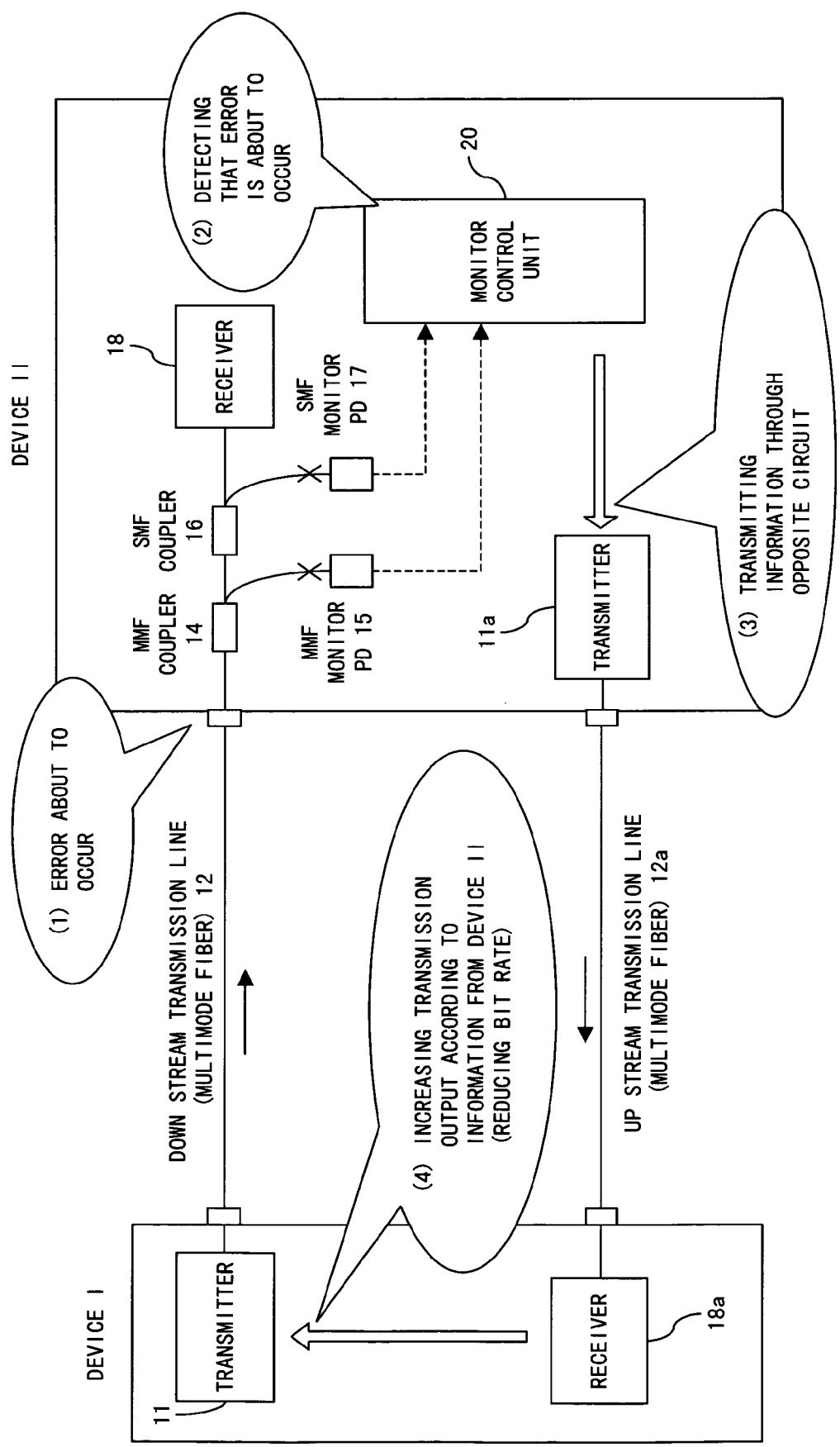
FIG. 11 shows the system configuration when output control of an up stream device is performed.
Figure 13:
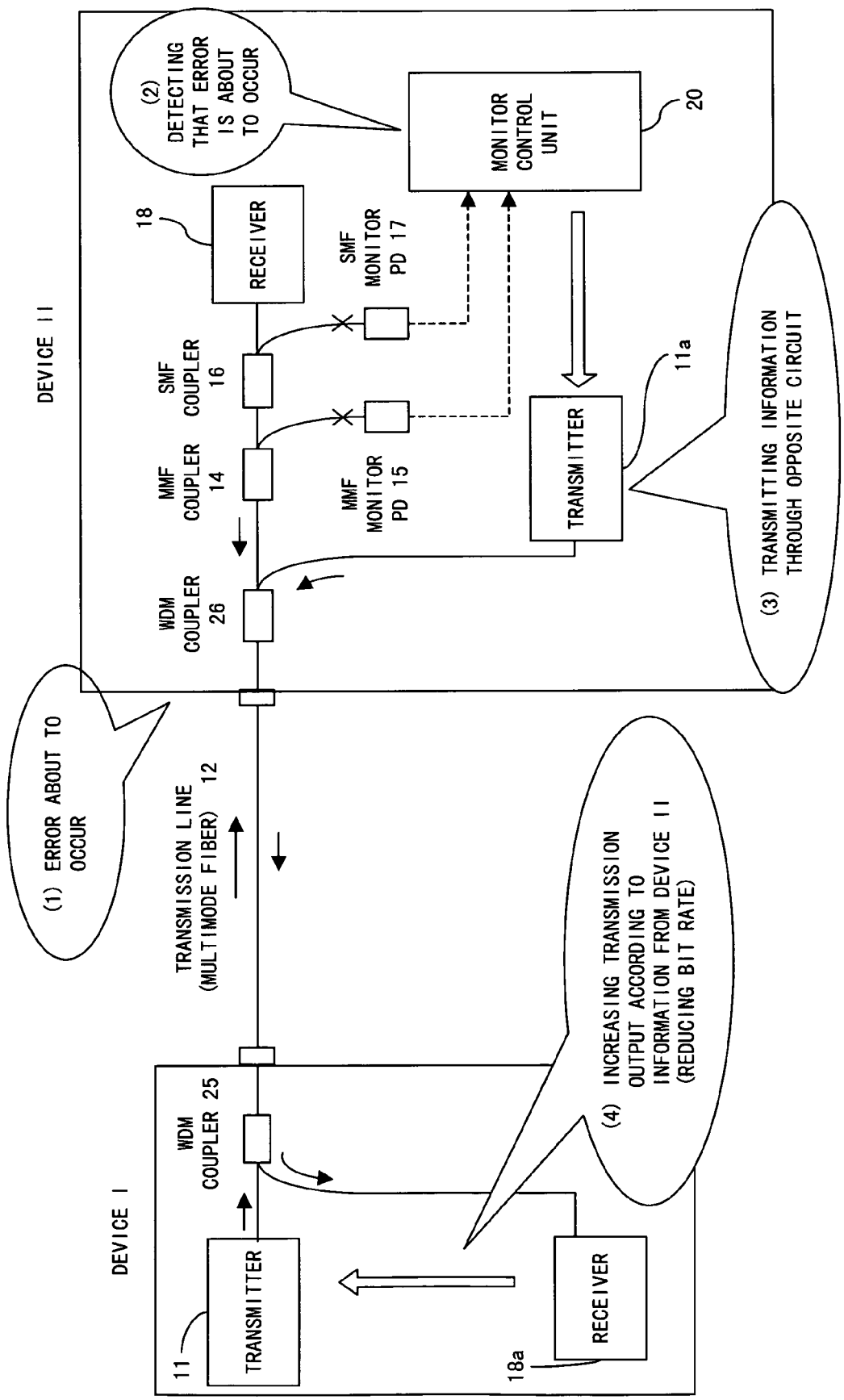
FIG. 13 shows the configuration in the case in which the configuration shown in FIG. 11 is realized by a single-core bidirectional communication system.

FIG. 11 shows the system configuration when output control of an up stream device is performed.

An optical signal is transmitted from the transmitter 11 of the device I, propagates through the down stream transmission line 12, and is branched by the MMF coupler 14 of the device II. The power of the branched optical signal is detected by the MMF monitor PD 15, and the result is transmitted to a monitor control unit 20. After passing through the MMF coupler 14, the optical signal is coupled from the MMF to the SMF, branched by the SMF coupler, and then detected by the SMF monitor PD 17. The result is transmitted to the monitor control unit 20. After passing through the SMF coupler 16, the optical signal is received by the receiver 18. The monitor control unit 20 calculates the coupling loss from the MMF to the SMF using the optical power at the point of the MMF coupler 14 and the optical power at the point of the SMF coupler 16, grasps the status of the occurrence of errors from the graph shown in FIG. 9, and increases the transmission optical power on the transmitting side, or transmits a request to reduce the transmission bit rate from a transmitter 11a to a receiver 18a through an up stream transmission line 12a. The device I receives the request from the device II through the receiver 18a, increases the transmission optical power or reduces the transmission bit rate, and transmits the optical signal through the transmitter 11.

FIG. 12 is a graph of a bit rate versus reception power.

As shown in FIG. 12, when a bit rate decreases, the rate of the occurrence of errors can be reduced (This is because errors do not occur frequently although the reception level of the optical signal is low). Therefore, when the state immediately before the occurrence of an error is detected, the occurrence of errors can be avoided by lowering the transmission rate of the up stream transmitter of the current circuit using the opposite circuit as shown in FIGS. 10 and 11.

When information about the current station is transmitted to the opposite station, a method for single-core bi-directional communication as shown in reception device 13 can also be used. In this case, a notification signal to the up stream is a low bit rate dedicated signal (pilot signal) so that it can be transmitted although there is an error occurring with the main signal.

Up stream optical signal and down stream optical signal are assigned different bands. To branch these signals, the WDM couplers 25 and 26 are used in the devices I and II respectively. The rest is the same as those of the configuration shown in FIG. 11. Therefore, their explanations are omitted here.

Figure 14:
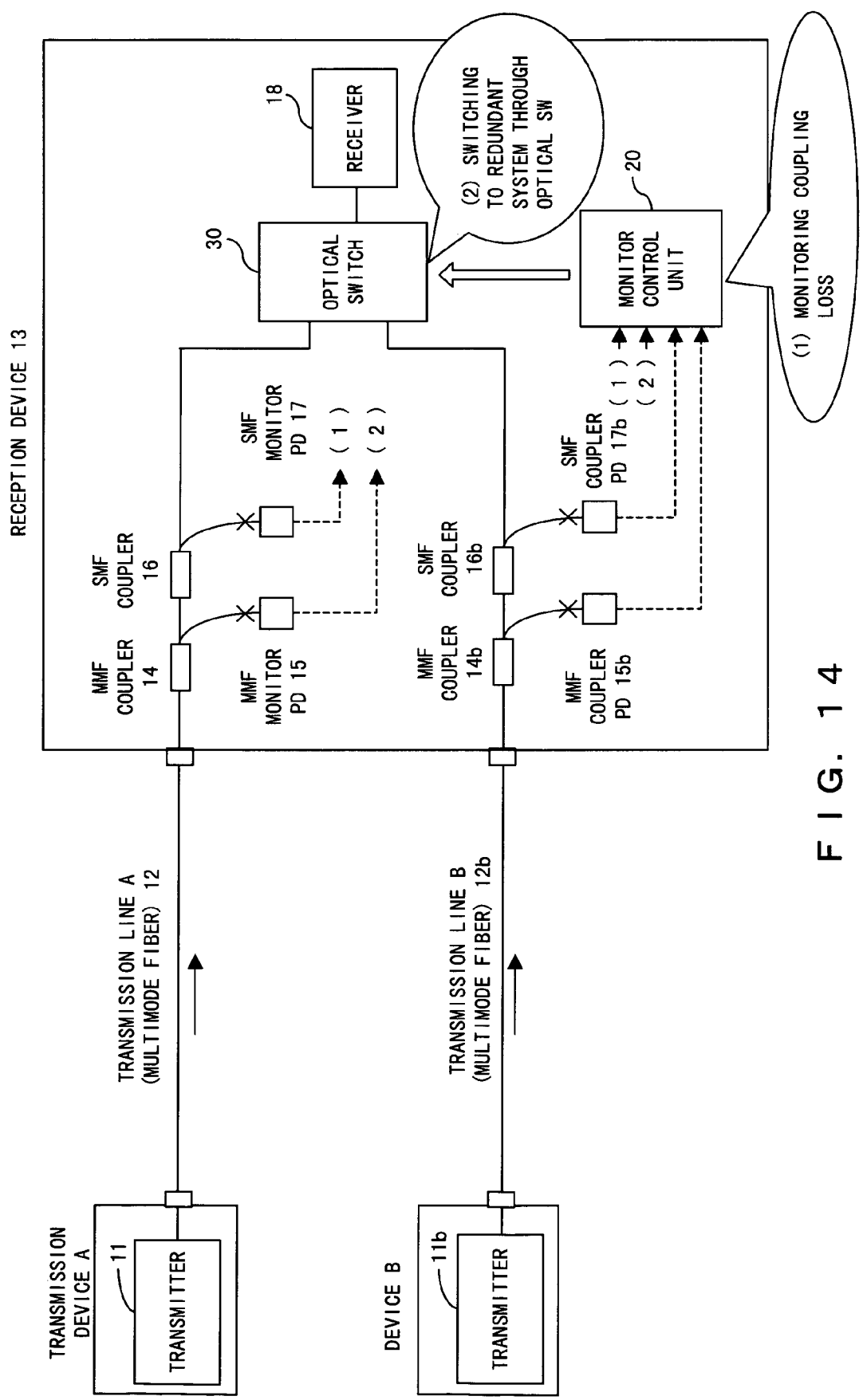
FIG. 14 shows a configuration (1) of an embodiment of the present invention applied to a redundant transmission line configuration.
Figure 15:
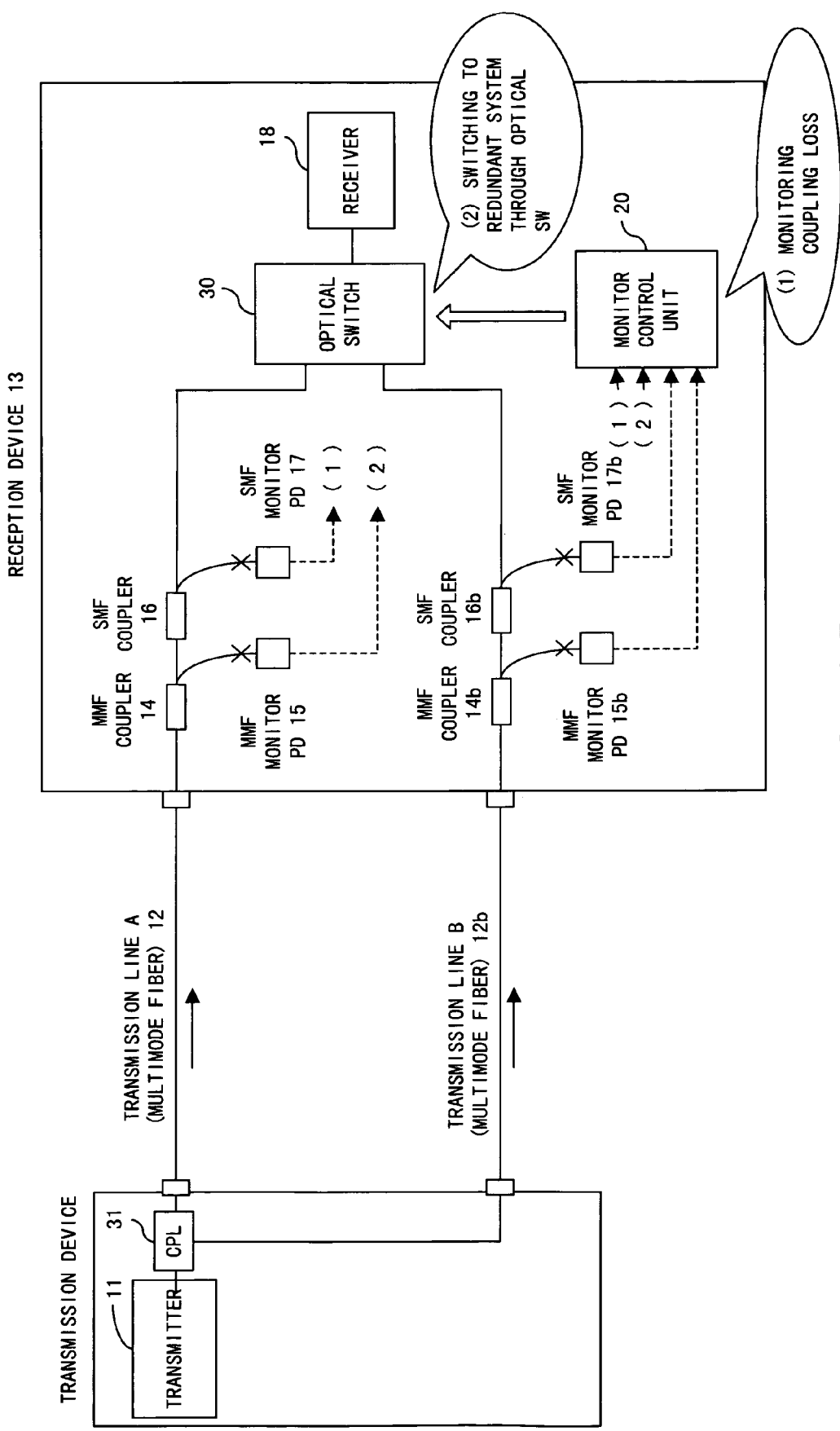
FIG. 15 shows a configuration (2) of an embodiment of the present invention applied to a redundant transmission line configuration.

FIGS. 14 and 15 show the configurations to which the configuration of an embodiment of the present invention is applied to a redundant transmission line configuration.

Some systems have transmission line redundancy. In this case, the transmission line is switched to the redundant side when it is detected that an error is about to occur, thereby avoiding the error.

In FIG. 14, a working circuit and a standby circuit are connected to different transmission devices. If the transmission line A 12 connected to the transmission device A is defined as the working circuit, then an optical signal is transmitted from the transmitter 11 to the reception device 13 through the transmission line A 12. At the reception device 13, the optical power before and after the connection point from the multimode fiber to the single-mode fiber is detected by the MMF coupler 14, the MMF monitor PD 15, the SMF coupler 16, and the SMF monitor PD 17, and transmitted to a monitor control unit 20. The optical signal is received by the receiver 18 via an optical switch 30. If the monitor control unit 20 determine that the coupling loss of the signal from the transmission line 12 has reached or exceeded a predetermined value, it switches the optical switch 30, selects the optical signal transmitted from transmitter 11b of the transmission device B through transmission line B 12b, and inputs the optical signal to the receiver 18. When the coupling loss of the transmission line A 12 is reduced, the optical switch 30 switches the signal so that the optical signal from the transmission line A 12 can be selected, or the transmission line B 12b can be selected until the degradation of the coupling loss of the transmission line B 12b is detected by the MMF coupler 14b, the MMF monitor PD 15b, the SMF coupler 16b, and the SMF monitor PD 17b.

FIG. 15 shows the configuration of accommodating the working and standby circuits in one transmission device. The components also shown in FIG. 14 are assigned the same reference numerals, and the explanations are omitted here. In FIG. 15, a coupler 31 for branching an optical signal from the transmitter 11 is provided. The optical signal branched by the coupler 31 is transmitted to the reception device 13 using the transmission line A 12 and the transmission line B 12b. The rest is the same as those of FIG. 14. That is, the signal is appropriately switched by the optical switch 30, and the optical signal having less errors is selected and received by the receiver 18.

Figure 16:
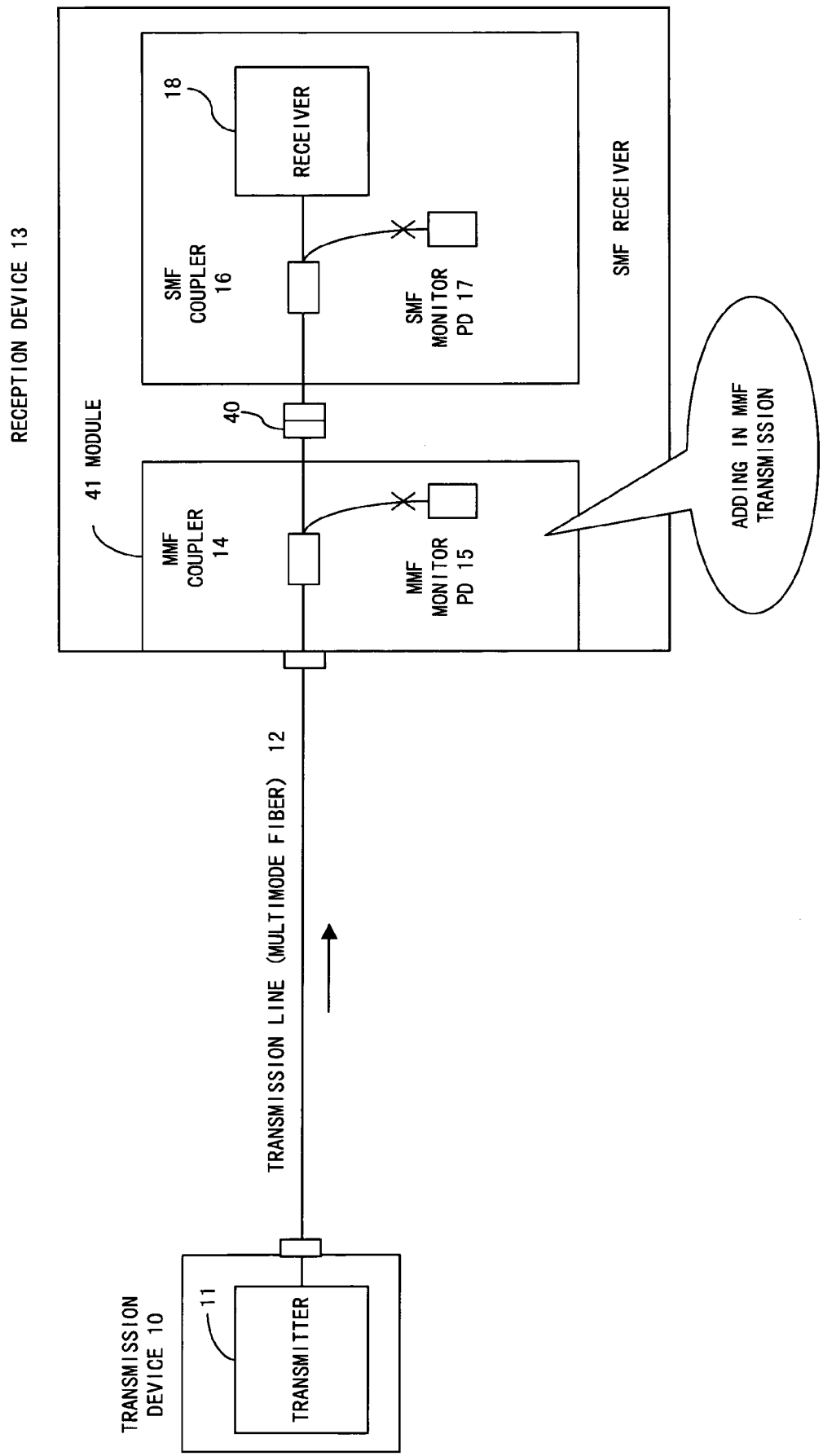
FIG. 16 is an explanatory view of a method of configuring an embodiment of the present invention.

FIG. 16 is an explanatory view of a method of configuring an embodiment of the present invention.

The configuration of loading the reception unit with a coupling loss monitoring function can be realized by a method of implementing the hardware from the first. However, considering the application of SMF dedicated equipment to MMF transmission, there is no great difference between designing a coupling loss by considering MMF transmission from the first and generating MMF dedicated equipment.

Therefore, as shown in FIG. 16, there is a method of providing a removable multimode fiber module 41 as an option in one of the two monitor functions.

In this method, when it is used in an SMF transmission line, a configuration can be designed by basic components only, that is, a reception unit and a monitor. When the transmission line is switched to MMF, the other monitor is added, thereby attaining the merit of the hardware configuration.

FIGS. 17 and 18 are explanatory views of other configurations required when the monitoring function is implemented as an optional module.

In the method shown in FIG. 16, there is a strong possibility of a large coupling loss due to the displacement of the center of the core of the portion (MMF/SMF adapter connection) connecting the reception unit to the optional unit. That is, although it is necessary to detect a coupling loss due to true modal noise, an additional loss occurs due to the physical displacement of the center, thereby degrading the performance of the entire system.

To avoid this, as shown in FIG. 17, a core adjusted fiber cord is used.

FIG. 18 shows the configuration of the fiber. The core-adjusted fiber is a fiber cord obtained by splice-connecting the MMF to the SMF. At the splice portion, the displacement of the center can be set to nearly zero, and the degradation of a transmission characteristic due to the displacement of the center of the core of the MMF/SMF connection unit can be removed.

When MMF is connected to the MMF side of the core adjusted fiber and SMF is connected to the SMF side of the core-adjusted fiber, the connection is made between MMF components or between SMF components. Therefore, the adapter connection does not generate a coupling loss due to the displacement of the center.

Figure 19:
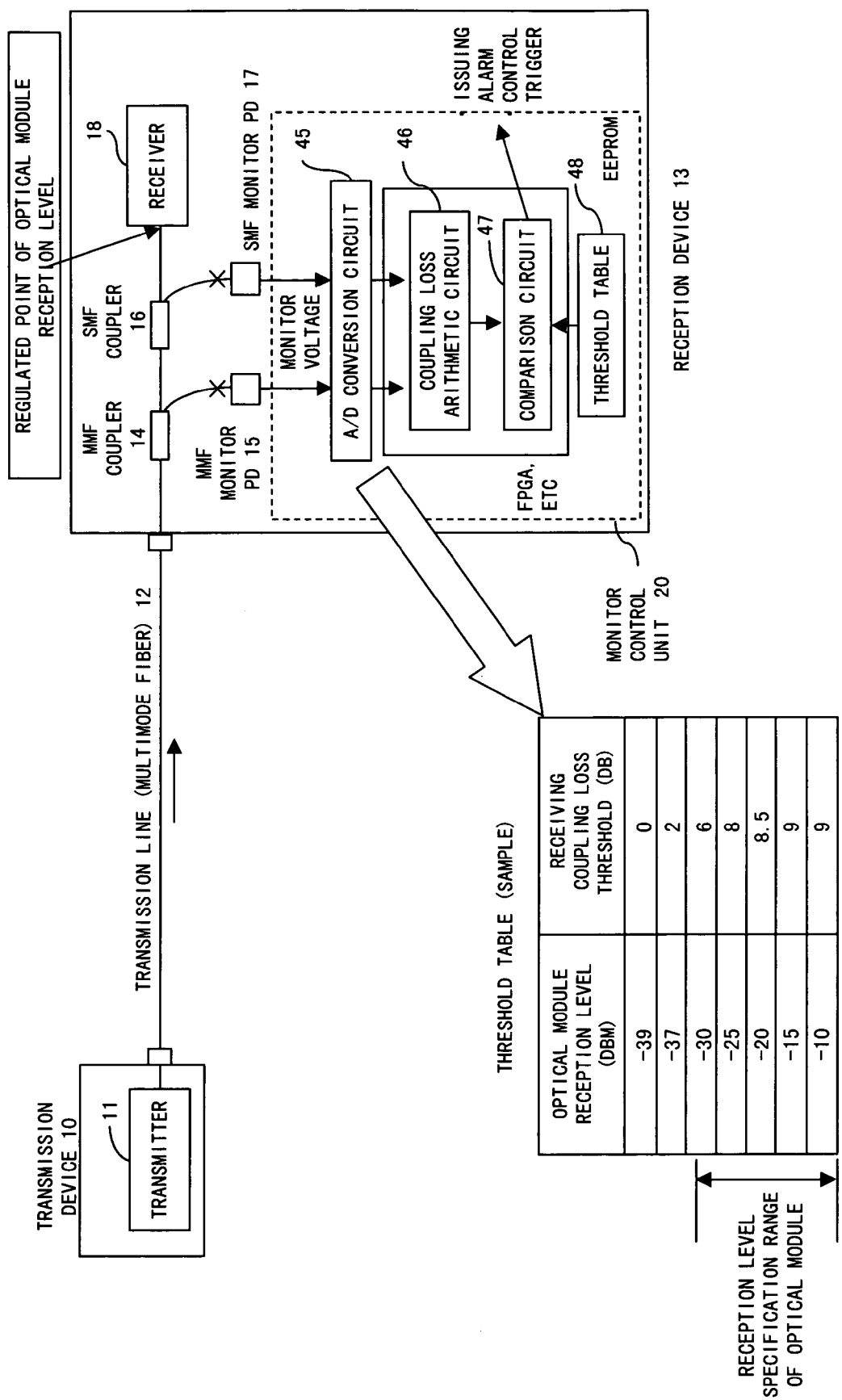
FIG. 19 is an explanatory view of a coupling loss threshold table.

FIG. 19 is an explanatory view of a coupling loss threshold table.

In FIG. 19, the components also shown in FIG. 6 are assigned the same reference numerals, and their explanations are omitted here. The optical power detected y the MMF monitor PD 15 and the SMF monitor PD 17 are each converted from a monitor voltage to a digital signal by an A/D conversion circuit 45. A coupling loss arithmetic circuit 46 obtains a coupling loss value by subtracting the monitor voltage value of the SMF monitor PD 17 from the monitor voltage value of the MMF monitor PD 15. Then, it reads data of a threshold table 48, obtains a threshold of a receiving coupling loss from the reception level of the reception level regulation point (entry point of the receiver 18) of the optical module, and compares it with the actually measured coupling loss using a comparison circuit 47. When the measured coupling loss is greater than the threshold of the coupling loss obtained from the threshold table 48, it is assumed that an error has occurred. Therefore, a control sequence is performed by raising an alarm, issuing a request to the transmitting side to lower the bit rate or raise the optical transmission power, etc. The coupling loss arithmetic circuit 46 and the comparison circuit 47 can be configured by an FPGA (field programmable gate array), etc.

In the threshold table shown at the lower left in FIG. 19, the threshold of the receiving coupling loss to the reception level of the optical module are stored. Normally, the reception level of the optical module is –30 dBm~–10 dBm. The threshold of the receiving coupling loss of the table is only an example, and does not reflect the values of an actual system.

Figure 20:
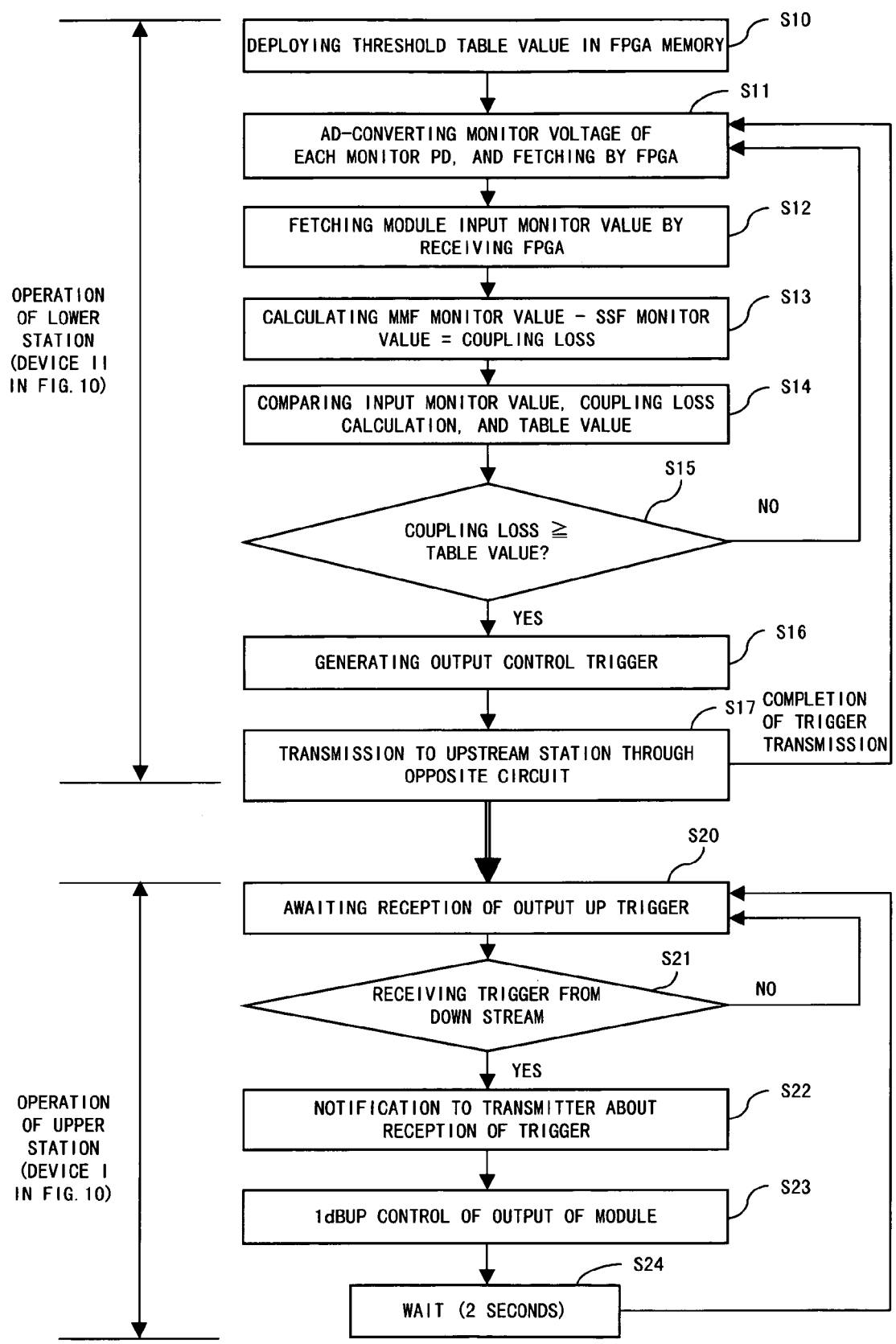
FIG. 20 is a flowchart of the operation of an up stream station and a down stream station under the control shown in FIG. 19.

FIG. 20 is a flowchart of the operations of the up stream station and the down stream station under the control shown in FIG. 19.

In steps S10 through S17, the processes of the down stream station (device II shown in FIG. 11) are shown. In step S10, the threshold table value is deployed in the FPGA memory. In step S11, the monitor voltage of each monitor PD is A/D converted, and fetched to the FPGA. In step S12, the input monitor value at the reception level regulating point of an optical module is fetched to the receiving FPGA. In step S13, the SMF monitor value is subtracted from the MMF monitor value, and the coupling loss is calculated. In step S14, the input monitor value, the coupling loss arithmetic value, and table values are compared. In step S15, it is determined whether or not the coupling loss exceeds the table value. If the determination in step S15 is NO, control is returned to step S11. If the determination in step S15 is YES, a control trigger (request to increase power) to increase the output is generated. In step S17, the control trigger is transmitted to the up stream using an opposite circuit, thereby returning control to step S11. The processes in steps S20 to S24 are performed by an up stream station (device I in FIG. 11). In step S20, control awaits the reception of a control trigger requesting an output increase. In step S21, it is determined whether or not a control trigger has been received from the down stream. If the determination in step S21 is YES, then the transmitter is notified of the reception of the control trigger in step S22. In step S23, the output of the transmitter module is controlled to rise by 1 dB. In step S24, control enters a wait status to complete the control, for example 2 seconds, after which control is returned to step S20.

Figure 21:
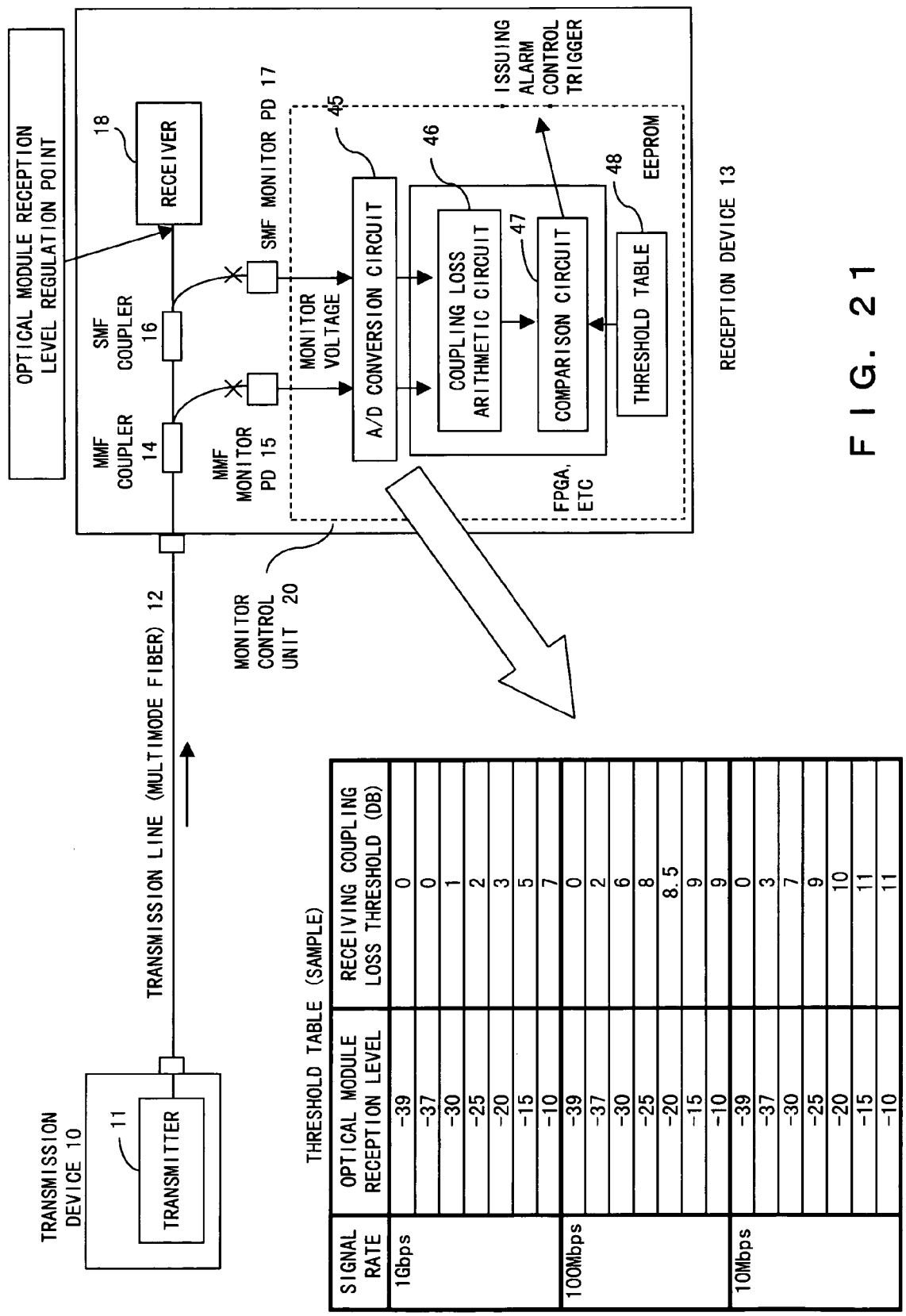
FIG. 21 is an explanatory view of another example of coupling loss threshold table.

FIG. 21 window signal generation circuit 21 describes another example of the coupling loss threshold table.

The configuration of the system is the same as that shown in FIG. 19, the detailed explanation is omitted here. In the threshold table shown in FIG. 21, a reception level at the reception level regulation point of an optical module and a threshold of a receiving coupling loss are stored at each signal rate of a transmitted signal. The table relating to the signal rate at the measurement time of the coupling loss is referred to. If it is determined that the coupling loss is greater than the threshold, the control trigger to request a decrease of the signal rate is transmitted to the sending side.

Figure 22:
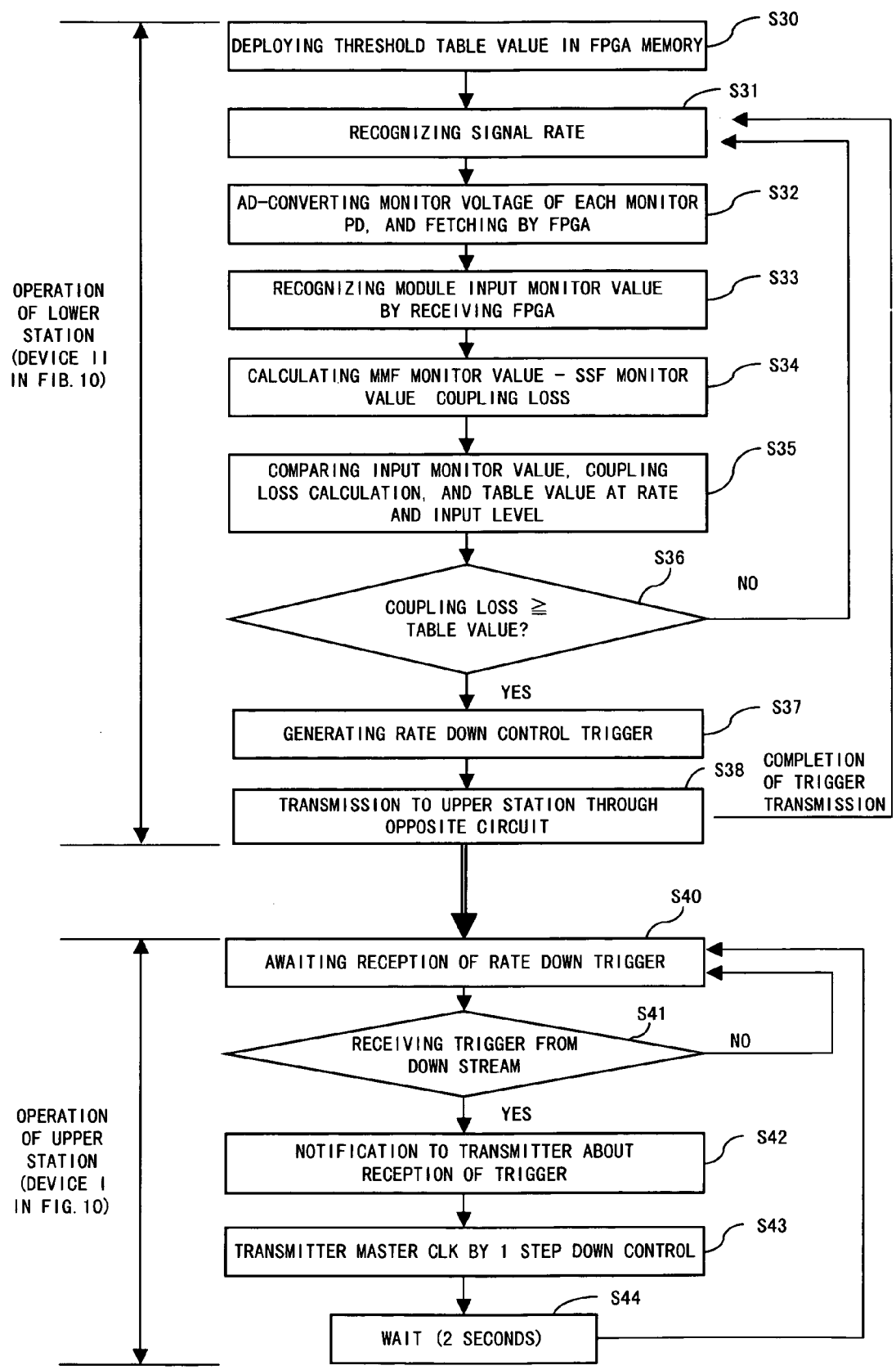
FIG. 22 is a flowchart of the operation of an up stream station and a down stream station under the control shown in FIG. 21.

FIG. 22 is a flowchart of the operation of an up stream station and a down stream station under the control shown in FIG. 21. The processes in steps S30 through S38 are performed by a down stream station (device II shown in FIG. 11). In step S31, the signal rate is recognized. In step S32, the monitor voltage of each monitor PD is A/D converted and fetched by the FPGA. In step S33, the input monitor value of a module is recognized by the receiving FPGA. In step S34, the SMF monitor value is subtracted from the MMF monitor value, and a coupling loss is calculated. In step S35, the input monitor value, a calculated coupling loss value, a current signal rate, and a table value at an input level are compared. In step S36, it is determined whether or not the coupling loss is equal to or greater than the table value. If the determination in step S36 is NO, control is returned to step S31. If the determination in step S36 is YES, a control trigger is generated to request a decrease in the signal rate in step S37. In step S38, a control trigger is transmitted to the upstream station using an opposite circuit.

The processes in steps S40 to S44 are performed by an up stream station (device I shown in FIG. 11). In step S40, the reception of a trigger to request to reduce the rate is awaited. In step S41, it is determined whether or not a control trigger has been received from the down stream. If the determination of step S41 is NO, control is returned to step S40. If the determination of step S41 is YES, a notification of the reception of the trigger is transmitted to the transmitter in step S42.

In step S43, the frequency of the master clock of the transmitter is reduced by one step. In step S44, correct control is awaited (for example, for two seconds), and control is returned to step S40.

What is claimed is:

1. A transmission system which receives an optical signal transmitted via a multimode fiber by a reception device for receiving a transmission signal through a single-mode fiber, comprising: an MMF light intensity detection device for detecting light intensity of an optical signal propagating in a multimode fiber at an input to a connection point between a multimode fiber and a single-mode fiber; an SMF light intensity detection device for detecting light intensity of an optical signal propagating in a single-mode fiber at an output from the connection point between the multimode fiber and the single-mode fiber; and a control device for obtaining a coupling loss of the connection point between the multimode fiber and the single-mode fiber from a detection result of the MMF light intensity detection device and the SMF light intensity detection device, and estimating an occurrence of errors of a signal in a reception device.

2. The system according to claim 1, wherein the occurrence of errors is estimated by comparing a coupling loss obtained by a measurement with a predetermined threshold.

3. The system according to claim 1, wherein a level of a frequency of signal errors is estimated by a level of the coupling loss.

4. The system according to claim 1, wherein when an occurrence of errors is estimated, a transmission device is requested to increase optical transmission power.

5. The system according to claim 1, wherein when an occurrence of errors is estimated, a transmission device is requested to reduce a bit rate of a transmission signal.

6. The system according to claim 4 or 5, wherein for transmission to the transmission device, a pilot signal lower in speed than a main signal is transmitted in an inverse direction of the main signal.

7. The system. according to claim 1, wherein when an occurrence of errors is estimated, the transmission system is switched to a standby system.

8. The system according to claim 1, wherein the MMF light intensity detection device or the SMF light intensity detection device is configured as a module, and can be attached to a reception device as necessary.

9. The system according to claim 1, wherein at a connection point between the multimode fiber and the single-mode fiber, a core adjusted fiber is connected with a small amount of eccentricity of a core of the multimode fiber and the single-mode fiber.

10. An optical apparatus comprising: a first detecting device detecting light intensity of an optical signal propagating in a multimode fiber at an input to a connection point between the multimode fiber and a single mode fiber, a second detecting device detecting light intensity of an optical signal propagating in the multimode fiber through single-mode fiber at an output from the connection point between the multimode fiber and the single mode fiber; an error estimating device estimating errors of an optical signal propagating in the multimode fiber from the detected intensity of said first detecting device and said second detecting device.

* * * * *